United States Patent Office 2,945,003
Patented July 12, 1960

2,945,003

NOVEL COPOLYMERS

Melvin M. Olson, Minneapolis, Minn., and Roger M. Christenson, Richland Township, Allegheny County, Pa., assignors to Pittsburgh Plate Glass Company No Drawing. Filed Dec. 14, 1953, Ser. No. 398,204

2 Claims. (Cl. 260—47)

This invention relates to novel copolymers, and pertains more particularly to copolymers of ethylenically unsaturated monomers and esters of polysilicic acid with unsaturated alcohols, and to the use of such copolymers as adhesives for uniting glass surfaces.

In a copending application, Serial Number 384,762, filed October 7, 1953, Patent No. 2,848,425, there is disclosed a novel method for preparing polysilicates (polyalkoxypolysiloxanes). The method set forth therein involves simultaneous esterification, hydrolysis and condensation reactions involving a tetrahalosilane, an alcohol and a carboxylic acid, and the polysilicates obtained are of the general formula:

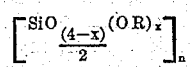

wherein R is the radical derived by removing the hydroxyl (OH) group from an alcohol, $x$ is a number which may be fractional, and $n$ is an integer. These materials may be open chain, cyclic or cross-linked in structure depending upon the value of $x$.

It has now been discovered that certain of the polysilicates prepared according to the method of the copending application (as well as by other methods disclosed hereinafter), namely, those in which the radical R is derived by removing the hydroxyl group from a primary alcohol having an ethylenic (>C=C<) group contiguous to the carbinol carbon atom, polymerize readily with ethylenically unsaturated monomers containing a terminal $CH_2$=C< group to give copolymers which are very useful in the preparation of castings, as adhesives for uniting glass surfaces, as a sizing material for glass fibers, as well as for many other purposes. The polymerization of the polysilicates with ethylenically unsaturated monomers provides an economical method of obtaining copolymers having long siloxane chains and possessing the many advantages thereof, as well as possessing many of the useful properties of the ethylenically unsaturated monomer. These copolymers are more resistant to hydrolysis than copolymers of the orthosilicates with ethylenically unsaturated monomers, which at best have only random orthosilicate groupings, with no siloxane chains being present.

The ester portion of the polysilicate utilized in preparing the copolymers of the present invention, that is, R in the structure:

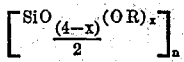

wherein $x$ and $n$ have the significance given herein above, may be derived from any primary alcohol having an ethylenic (>C=C<) group contiguous to the carbinol carbon atom. Preferred alcohols of this class are the readily obtainable allyl and metallyl alcohols which give the corresponding allyl and methallylpolysilicates, although other unsaturated primary alcohols such as 2-pentene-1-ol, 2-hexene-1-ol, 2-octene-1-ol, 4-chloro-2-pentene-1-ol, crotonyl alcohol and propargyl alcohol may be used with good results. Preferably, the alcohol should contain no more than 6 carbon atoms.

The alkenyloxy to silicon ratio, that is, the ratio of OR to Si in the polysilicate may be varied considerably, depending, of course, on the value of $x$ in the above structural formula. For example, the ratio may be as low as about 0.85 to 1 or as high or slightly higher than 3.0 to 1. Best results are obtained, however, when the ratio is about 1.5 to 1 or 2.5 to 1. When the ratio is below about 0.85 to 1 very viscous materials containing large amounts of silica and which are substantially incompatible with ethylenically unsaturated monomers are obtained. On the other hand, when the ratio is 4 to 1, the product is the orthosilicate, which is, of course, not a polysilicate and which is not desirably used in copolymerizations with ethylenically unsaturated monomers inasmuch as the orthosilicate group is easily hydrolyzed.

In addition to the method of the copending application referred to hereinabove, the esters of polysilicic acid with unsaturated primary alcohols having a >C=C< group contiguous to the carbinol carbon atom can be prepared by the partial hydrolysis and concomitant or subsequent condensation of the intermediate silanols to form the polysiloxanes or polysilicates, or by preliminarily preparing a tetralkoxysilane or alkyl orthosilicate, adding glacial acetic acid to the resultant orthosilicate to first form a trialkoxysilanol, which condenses to form hexalkoxydisilicate with liberation of water, which water further hydrolyzes the starting tetralkoxysilane to form the higher polysilicates.

The ethylenically unsaturated monomer which is polymerized with the polysilicate esters according to this invention may be selected from the following group:

(1) Monoolefinic hydrocarbons, that is, monomers containing only atoms of hydrogen and carbon, such as styrene, alpha-methyl styrene, alpha-ethyl styrene, alpha-butyl styrene and vinyl toluene, and the like.

(2) Halogenated monoolefinic hydrocarbons, that is, monomers containing carbon, hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, chloroethylene (vinyl chloride), 1,1-dichloroethylene (vinylidene chloride), bromoethylene, fluoroethylene, iodoethylene, 1,1-dibromoethylene, 1,1-difluoroethylene, 1,1-diiodethylene, and the like;

(3) Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate, methyl acrylate, ethyl acrylate, propyl acrylate, isopropyl acrylate, butyl acrylate, isobutyl acrylate, amyl acrylate, hexyl acrylate, 2-ethyl-hexyl acrylate, heptyl acrylate, octyl acrylate, 3,5,5-trimethyl-hexyl acrylate, decyl acrylate and dodecyl acrylate, isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate, and vinyl alpha-bromovalerate;

Allyl chlorocarbonate, allyl formate, allyl acetate, allyl propionate, allyl butyrate, allyl valerate, allyl caproate, diallyl phthalate, diallyl succinate, diethylene glycol bis-(allyl-carbonate), allyl 3,5,5-trimethylhexoate, diallyl adipate, diallyl sebacate, diallyl fumarate, allyl soyate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, diallyl-3,4,5,6,7,7-hexachloro $\Delta^4$ endomethylene tetrahydrophthalate, as well as methallyl esters corresponding to the above allyl esters, as well as esters from such alkenyl alcohols as beta-ethyl allyl alcohol, beta-propyl allyl alcohol, 1-buten-4-ol, 2-methyl-buten-1-ol-4, 2(2,2-dimethylpropyl)-1-buten-4-ol and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, dimethallyl fumarate and diethyl glutaconate;

(4) Organic nitriles such as acrylonitrile, methacrylonitrile, ethacrylonitrile, crotonitrile, and the like;

(5) Acid monomers such as acrylic acid, methacrylic acid, crotonic acid, 3-butenoic acid, angelic acid, tiglic acid and the like;

(6) Amides such as acrylamide, alpha-methyl acrylamide, N-phenyl acrylamide, N-methyl, N-phenyl acrylamide, N,N'methylenebisacrylamide, N-tert-butylacrylamide and other N-tert-alkylacrylamides, and the like.

It will be noted that all of the above monomers contain a single terminal $CH_2=C<$ or an alpha, beta unsaturated ester group. The preferred monomers of this group for polymerization with the polysilicates are the alkyl esters of methacrylic acid, and particularly methyl methacrylate. Styrene and alpha-methyl styrene also give excellent copolymers when polymerized with the unsaturated primary alcohol esters of polysilicic acid. Mixtures of two or more of the above monomers may also be employed.

The respective quantities of the polysilicate and the ethylenically unsaturated monomer utilized in carrying out the polymerization may be varied widely. For example, the polysilicate may be utilized in amounts as low as 5 percent by weight to 90 percent by weight, based on the total weight of the polymerizable components, with the ethylenically unsaturated monomer or monomers being present in an amount of from 10 to 95 percent by weight. However, when the amount of the polysilicate is above about 50 percent by weight, the resulting copolymers tend to be rather spongy in nature, and consequently large amounts of the polysilicate are not desirably used; in fact, it is preferred that the polysilicate be charged in an amount of about 5 to 25 percent by weight, with the balance of the polymerizable mixture being the ethylenically unsaturated monomer or monomers.

The polymerization reaction may be carried out in several different ways. One preferred method consists simply in heating and agitating a mixture of monomers and polymerization catalyst without the use of a solvent or other liquid medium, until polymerization has progressed to the desired extent, usually from 1 to 25 hours.

Alternatively, the polymerization may be carried out by first dissolving the polysilicate and the ethylenically unsaturated monomer in benzene or other aromatic solvents such as toluene, methyl toluene, trichlorobenzene or the like, or aliphatic solvents, utilizing an amount of solvent such that the mixture is easily stirrable. A polymerization catalyst is included in this solution and the resulting mixture is heated to a temperature of about 50° C. to 200° C. whereupon polymerization occurs to form the desired copolymer. The resulting copolymer, particularly when the ethylenically unsaturated monomer is an alkyl ester of methacrylic acid, is ordinarily in the form of hard, clear solid. However, viscous liquid resinous materials and soft solids may also be obtained in some instances, depending upon such factors as the charging ratios of the monomeric components, polymerization temperature, the specific nature of the ethylenically unsaturated monomer and the polymerization time.

The catalyst which is utilized in the polymerization is preferably a peroxygen compound such as benzoyl peroxide, caproyl peroxide, lauroyl peroxide, acetone peroxide, acetyl benzoyl peroxide, cumene hydroperoxide, o,o'-dichlorobenzoyl peroxide, o,o'-dibromobenzoyl peroxide, caprylyl peroxide, pelargonyl peroxide, tertiary butyl hydroperoxide, methylamyl ketone peroxide, cyclohexanone peroxide, hydroxycyclohexyl hydroperoxide, tetralin peroxide, heptyl hydroperoxide, and the like. Other catalysts such as the perborates, peracetic acid, di-tertiary butyl di-perphthalate, tertiary butyl permalic acid, the diazo compounds and actinic light may also be utilized. In general, from 0.02 to 5.0 percent by weight of the catalyst is utilized, with about 0.1 percent to 2.0 percent by weight be especially preferred.

The following examples illustrate the preparation of copolymers of ethylenically unsaturated monomers and esters of polysilicic acid with primary alcohols having an ethylenic group contiguous to the carbinol carbon atom, in accordance with this invention, but are not to be construed as a limitation upon the scope thereof, for there are, of course, numerous possible variations and modifications. In the examples, all parts are by weight.

*Example I*

Eight grams of methyl methacrylate, 2 grams of allyl polysilicate (allyloxy to silicon ratio=2.00) and 0.2 gram of cumene hydroperoxide were heated in a steam bath (about 95° C.) for 17 hours and heated an additional 8 hours at 150° C. A hard, clear copolymer was obtained.

*Examples II to XXI*

In Examples II to XXI allyl polysilicates having various allyloxy to silicon ratios were polymerized with a number of different ethylenically unsaturated monomeric compounds utilizing widely varying monomer charging ratios, polymerization temperatures and polymerization time. The pertinent data is recorded in the following table:

phate were heated on a steam bath until quite viscous and then poured into a mold. The mold was then heated

| Example | Ethylenically Unsaturated Monomer and Weight Thereof | Weight Polysilicate (Grams) | Allyloxy to Silicon Ratio in polysilicate | Catalyst and Weight Thereof | Polymerization Temperature (° C.) | Polymerization Time (Hours) | Copolymer Description |
|---|---|---|---|---|---|---|---|
| II | 5 grams methyl methacrylate | 5 | 2.24 | 0.2 gram cumene hydroperoxide. | 100 | 16 | Very hard solid. |
| III | 9 grams methyl methacrylate | 1 | 2.0 | 0.1 Gram 50-50 mixture-benzoyl peroxide and tricresyl phosphate. | 95 | 8 | Hard, clear solid. |
| IV | 4 grams methyl methacrylate | 6 | 2.0 | 0.2 gram cumene hydroperoxide. | 95 / 150 | 16 / 8 | Slightly cloudy, soft solid. |
| V | 9 grams styrene | 1 | 1.63 | ----do---- | 150 | 7¼ | Very hard solid, non-brittle. |
| VI | 5 grams styrene | 5 | 1.63 | 0.1 gram cumene hydroperoxide. | 150 | 19 | Do. |
| VII | 2.5 grams styrene | 7.5 | 1.43 | 0.01 gram cumene hydroperoxide. | 150 | 19 | Very hard, non-brittle solid, slightly hazy. |
| VIII | 8 grams alpha-methyl styrene | 2 | 2.0 | 0.2 gram cumene hydroperoxide. | 175 | 16 | Slightly yellow solid. |
| IX | 5 grams alpha-methyl styrene | 5 | 2.24 | ----do---- | 125 | 16 | Clear liquid. |
| X | 9 grams vinyl acetate | 1 | 1.43 | 0.1 gram benzoyl peroxide | 55 | 24 | Cloudy solid. |
| XI | 5 grams vinyl acetate | 5 | 1.43 | ----do---- | 55 | 24 | Slightly cloudy solid. |
| XII | 9 grams diallyl phthalate | 1 | 2.17 | 0.1 gram cumene hydroperoxide. | 150 | 49 | Slightly yellow clear solid; very hard, non-brittle. |
| XIII | 5 grams diallyl phthalate | 5 | 2.17 | ----do---- | 150 | 49 | Clear, soft solid. |
| XIV | 1 gram diallyl phthalate | 9 | 2.17 | ----do---- | 150 | 49 | Clear, slightly yellow, solid. |
| XV | 9.5 grams dimethallyl adipate | 0.5 | 2.0 | 0.2 gram cumene hydroperoxide. | 150 | 24 | Clear, slightly yellow gel. |
| XVI | 5 grams dimethallyl adipate | 5 | 2.24 | ----do---- | 150 | 19 | Very viscous liquid |
| XVII | 5 grams diallyl sebacate | 5 | 2.24 | ----do---- | 150 | 19 | Clear liquid. |
| XVIII | 9 grams diallyl fumarate | 1 | 2.17 | 0.1 gram benzoyl peroxide | 150 | 23 | Hard, Yellow solid. |
| XIX | 5 grams diallyl fumarate | 5 | 2.17 | 0.1 gram cumene hydroperoxide. | 100 | 23½ | Clear hard solid. |
| XX | 10 grams alpha-methyl styrene / 0.5 gram sytrene | 10 | 1.30 | 0.2 gram benzoyl peroxide | 150 | 48 | Soft solid. |
| XXI | 6.5 grams diallyl phthalate / 3 grams diallyl sebacate | 0.5 | 2.24 | 0.1 gram cumene hydroperoxide. | 140 | 6 | Very viscous clear solution. |

Example XXII

To illustrate the use of the copolymers of this invention as adhesives to unite glass surfaces, 10 parts of allyl polysilicate having an allyloxy to silicon ratio of 2.0, and 90 parts of methyl methacrylate were admixed with 0.02 percent by weight of benzoyl peroxide and the resulting mixture heated at 85° C. until a viscous solution having a Gardner-Holdt viscosity of W was obtained. This material was partially stripped of unreacted monomeric methyl methacrylate by stirring at room temperature under vacuum. The residue was then placed between glass plates and heated for 5 to 6 hours, gradually raising the temperature from 46° C. to 132° C. The glass could not be removed from the copolymer interlayer except by chipping the glass.

Example XXIII

A viscous syrup such as that prepared in Example XXII was used to prepare a laminate by impregnating glass fiber mats with the resin and curing the laminate at about 45° C. to 125° C. for 74 hours. The resulting laminate had a compressive strength of 27,089 p.s.i. A similar laminate prepared from a homopolymer of methyl methacrylate had a compressive strength of only 18,600 p.s.i., whereas a laminate prepared utilizing a polyester resin had a compressive strength of 20,000 p.s.i. This data demonstrates that the copolymers of this invention adhere to glass much more strongly than do either methyl methacrylate or polyester resins. This property renders the copolymers useful as a sizing material for glass fibers, particularly where the fibers are to be utilized with polyester resins in the formation of laminates and the like. By sizing glass fibers with a copolymer such as that described in this example, a very strong polyester to glass bond is obtained.

Example XXIV

A casting was prepared as follows: 20 grams of allyl polysilicate (allyloxy silicon ratio=2.0), 180 grams of methyl methacrylate, and 1 gram of a 50-50 weight percent mixture of benzoyl peroxide and tricresyl phosphate were heated on a steam bath until quite viscous and then poured into a mold. The mold was then heated at 170° F. for one hour and 270° F. for one hour. The resulting copolymer had a Barcol hardness of 78, whereas a copolymer prepared from 180 grams of methyl methacrylate and 0.9 gram of the same catalyst and cured at the same temperatures as the allyl polysilicate-methyl methacrylate copolymer had a Barcol hardness of only 40.

When the above examples are repeated utilizing esters of polysilicic acid with other of the primary unsaturated alcohols disclosed hereinabove, polymers are obtained which are in general equivalent to those of the specific examples. Similarly, when other polymerization methods and conditions are utilized, good results are obtained.

Although specific examples of the invention have been herein described, it is not intended to limit the invention solely thereto, but to include all of the variations and modifications falling within the spirit and scope of the appended claims.

We claim:

1. A method of forming a copolymer resin which is soluble in toluene, said method comprising heating to a temperature of about 50° C. to about 200° C., a mixture of (A) about 0.2 to about 5 percent by weight based upon the mixture of an organic peroxide catalyst of interpolymerization of the mixture; (B) about 50 to about 90 percent by weight based upon the mixture of a polymerizable monomeric compound containing a $>C=CH_2$ group, the rest of the mixture being a polysiloxane which is soluble in aromatic hydrocarbon solvents and which consists of units which are of the average empirical formula:

$$SiO_{\frac{4-x}{2}}(OR)_x$$

wherein R is a group selected from the class consisting of allyl and methallyl, $x$ being a number from 1.5 to 2.5, and continuing to heat the mixture until said interpolymer is formed.

2. The method of claim 1, wherein the group R is allyl.

(References on following page)

References Cited in the file of this patent

UNITED STATES PATENTS

| | | |
|---|---|---|
| 2,438,520 | Robie et al. | Mar. 30, 1948 |
| 2,438,612 | MacKenzie et al. | Mar. 30, 1948 |
| 2,443,740 | Kropa et al. | June 22, 1948 |
| 2,716,638 | Cohen et al. | Aug. 30, 1955 |
| 2,728,740 | Iler | Dec. 27, 1955 |
| 2,777,829 | Andrews et al. | Jan. 15, 1957 |

OTHER REFERENCES

Peppard et al.: "Journ. Am. Chem. Soc.," vol. 68, January 1946, pages 68–72. (Copy in Scientific Library.)